United States Patent
Huang

[19]

[11] Patent Number: 5,816,103

[45] Date of Patent: Oct. 6, 1998

[54] BALL WORM AND WORM GEAR DEVICE

[75] Inventor: Chun-Hung Huang, Hsinchu, Taiwan

[73] Assignee: Industrial Technology Research Institute, Hsinchu, Taiwan

[21] Appl. No.: 678,550

[22] Filed: Jul. 9, 1996

[51] Int. Cl.[6] .............................. F16H 1/16; F16H 55/10
[52] U.S. Cl. ............................................... 74/425; 74/458
[58] Field of Search ....................... 74/425, 458

[56] References Cited

U.S. PATENT DOCUMENTS

4,023,433   5/1977   Schutz .......................................... 74/425
5,373,753   12/1994   Toyomasa .............................. 74/425 X

*Primary Examiner*—Allan D. Herrmann
*Attorney, Agent, or Firm*—W. Wayne Liauh

[57] ABSTRACT

The present invention is a ball worm and worm gear device which is a ball worm structure consisting of an arbor, a helix body and a housing where the said helix body further consists of a back-flow socket pipe that encase the arbor and a helical socket pipe that further encase the said back-flow socket pipe; Both the two socket pipes possess a back-flow channel and a helical channel respectively, having helical shapes but in opposite directions with their inlets and outlets connected each other, to form inner and outer channels of the helix body; These channels contain many balls which are constrained in the channels of the helix body to keep them from dropping off by encasing the housing around the helix body. Since the said two channels are opposite in helical directions, the balls in the helical channel of the helix body can roll back to the starting position after rolling to the back-flow channel by means of the transport phenomenon generated by the relative rotation between the back-flow channel and the the arbor, thereby, to form an unobstructive loop of the ball rotation which ends up with raising the transmission efficiency and lowing the wearing.

6 Claims, 9 Drawing Sheets

BALL WORM AND WORM GEAR DEVICE

FIELD OF INVENTION

The present invention is related to a ball worm and worm gear device which especially indicates that the balls on the ball worm can be driven to the starting position by means of transport phenomenon generated between the back-flow channel and the arbor, to form a complete loop of ball rolling.

BACKGROUND OF THE INVENTION

Figure 1:
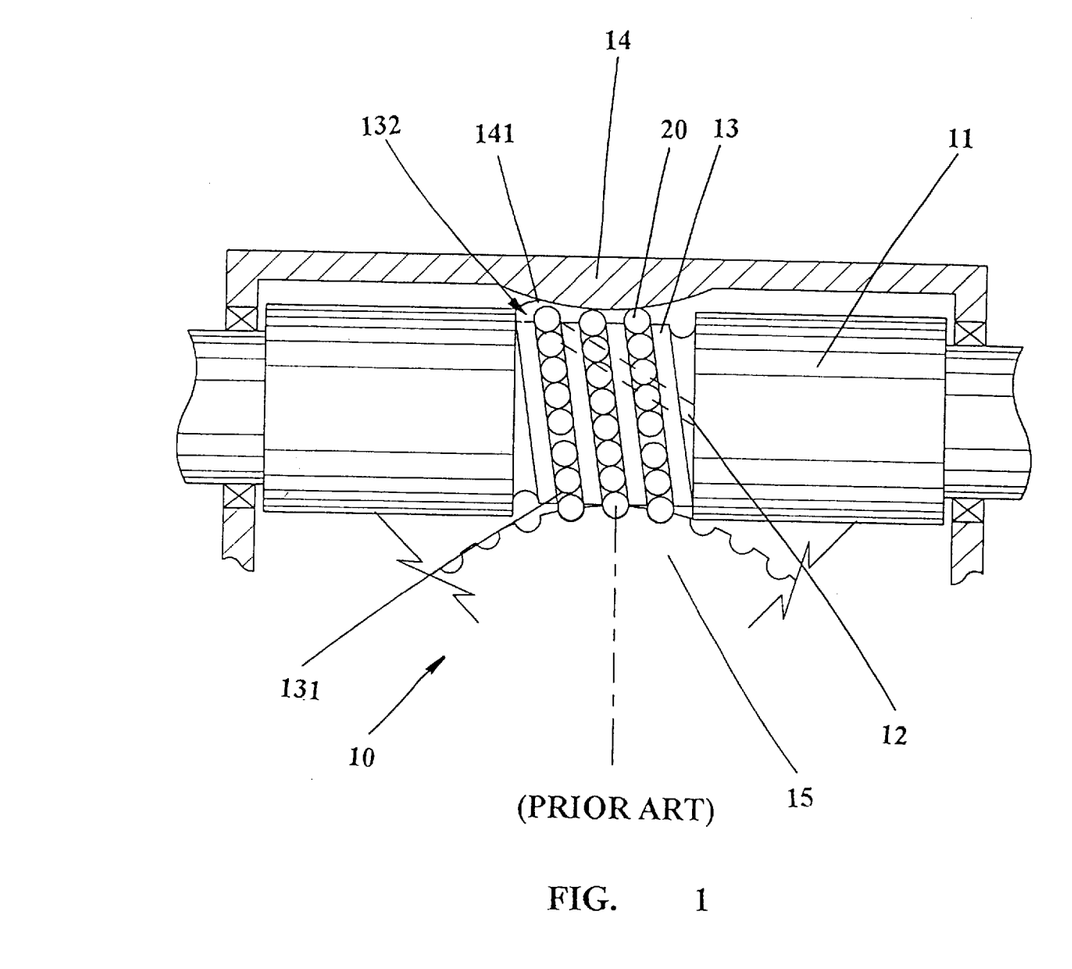
FIG. 1 is the schematic structure diagram of the ball worm and worm gear combination of the prior art.

The transmission of conventional worm and worm gear combination is by means of the direct contact between the worm and worm gear while the one of ball worm and worm gear is by means of the balls. This kind of design not only can change the sliding friction into a rolling friction but also can raise the transmission efficiency as well as lower the amount of wearing. In order that the balls can be used in the worm and worm gear combination, the worm has to be designed to have a ball back-flow channel to enable the balls to push forward and transport continuously. In other words, the balls roll in the threads of of the worm and finally roll back to the starting position through the back-flow channel, thereby, to form a ball rolling loop; the ball worm and worm gear combination device of the prior art is shown in FIG. 1 where there is a ball back-flow channel 12, in inclined shape, inside the ball worm 11 in the said ball worm and worm gear combination 10, and at its outer rim there is a thread 13 with its two ends being connected to the two ends, respectively, of the ball back-flow channel 12; the helical channels 131 formed by the threads in between themselves, contain many balls 20 which are constrained in the helical channels 131 without droping at the outer edge of the said ball worm 11 by the blocking of the exterior guided rod 14 and the meshing of the ball worm 15, and there is a stop plate 141 established at the inlet where the said helical channel intended to enter the back-flow channel 12 to retain the balls in rolling into the back-flow channel 12; as the said ball worm and worm gear combination 10 performs rotating, the balls 20 in the helical channel 131 will roll into back-flow channel 12 through the inlet 132 and their motion will be changed from rotation motion into linear motion, and finally, at the other end of the back-flow channel 12, the balls 20 roll out toward the helical channel 131 through the pushing and squeezing among the balls 20 themselves, thereby, form a ball rolling loop. But, the structure of the ball worm and worm gear combination 10 still has many blind spots in actual application such as:

(1) The motion mode of the ball back-flow channel is different from that of the ball helical channel;

(2) The ball back-flow channel can not connect smoothly to the ball helical channel;

(3) The balls have to push and squeeze in the back-flow channel before they can perform motion and this is not efficient.

It is because of these various kinds of shortcomings that make the transmission efficiency of the said ball worm and worm gear combination unable to be elevated and the fact that it can not be utilized in actual application results in a big loss in the industry.

For this, therefore the inventor, accumulated from many years of studies and through countless testings, tries to originate and to improve, to urgently overcome the above-mentioned shortcomings in order to positively attain the efficacy of raising the transmission efficiency as well as lowering the wearing.

SUMMARY OF THE INVENTION

The main object of the present invention is to provide a ball worm and worm gear device wherein the ball worm has a helix body which consists of a back-flow socket pipe and a helical socket pipe in helical shape with opposite directions to enable the balls' motion mode not to be changed, and to raise transmission efficiency.

The second object of the present invention is to develop a ball worm and worm gear device wherein its arbor and back-flow channel are two different components; to enable their relative motion between them by rotating the said back-flow channel with the arbor stay fixed and further create transport phenomenon to drive the balls pushing forward to generate motion without relying upon their squeezing and pushing action.

Another object of the present invention is to develop a ball worm and worm gear device wherein the intersection of the said back-flow channel and the helical channel can be a designed in the shape of a circular arc to enable smoother connection between the said two channels.

For these reasons and in order to make your honor examiners further understand the objects, characteristics and efficacies of the present invention, the authors herewith present a detailed and clear illustration together with concrete embodiments and the accompanied drawings:

BRIEF DESCRIPTION OF THE DRAWINGS AND THEIR COMPONENT NUMBERS (A) The Drawings

(B) The Component Numbers

10 Worm and worm gear combination of the prior art
11 Ball worm
12 Back-flow channel
13 Thread
131 Channel
132 Inlet
14 Exterior guide
141 Stopping plate
15 Ball worm gear
20 Balls
30 The ball worm and worm gear combination
31 Ball worm
32 Arbor
33 Helix body
34 Housing
341 Small channel
342 Small ball
343 Screw
344 Opening
345 Cover plate
35 Back-flow socket pipe
351 Back-flow channel
352 The location of the outlet
353 The location of the inlet 36 Helical socket pipe
361 Helical channel
362 Inlet channel
363 Outlet channel
364 Circular arc

DETAILED DESCRIPTION OF THE INVENTION

Figure 2:
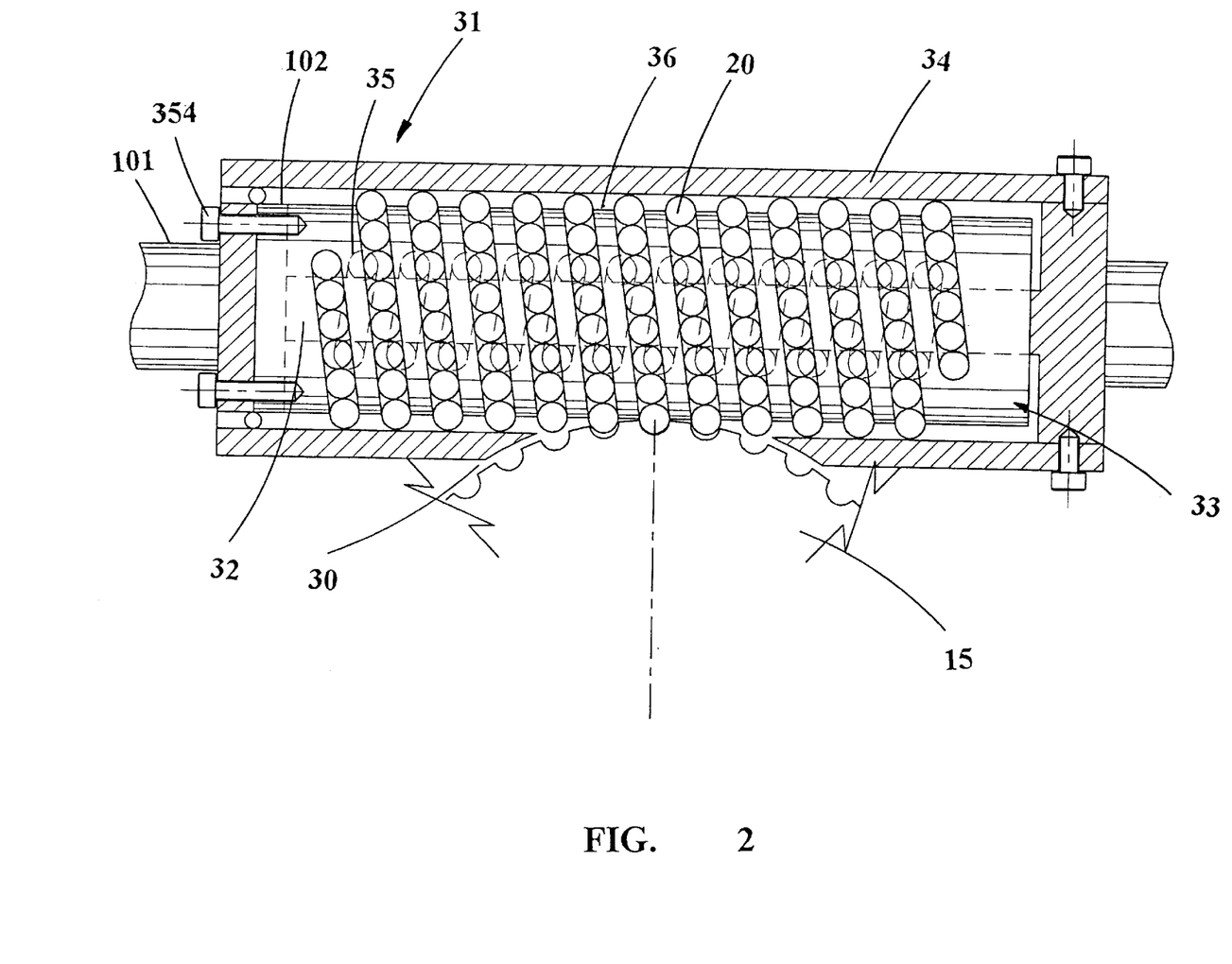
FIG. 2 is the schematic structure diagram of the ball worm and worm gear combination of the present invention.
Figure 3A:
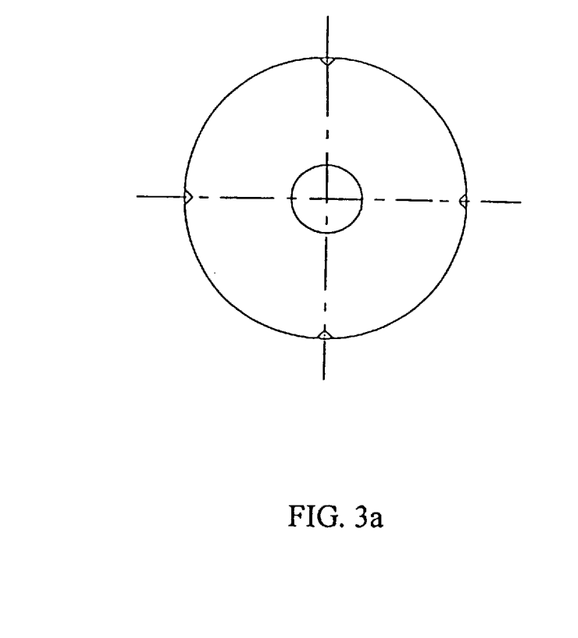
FIG. 3 through FIG. 6 are the analytical structure diagrams of the ball worm's components of the present invention.
Figure 3B:
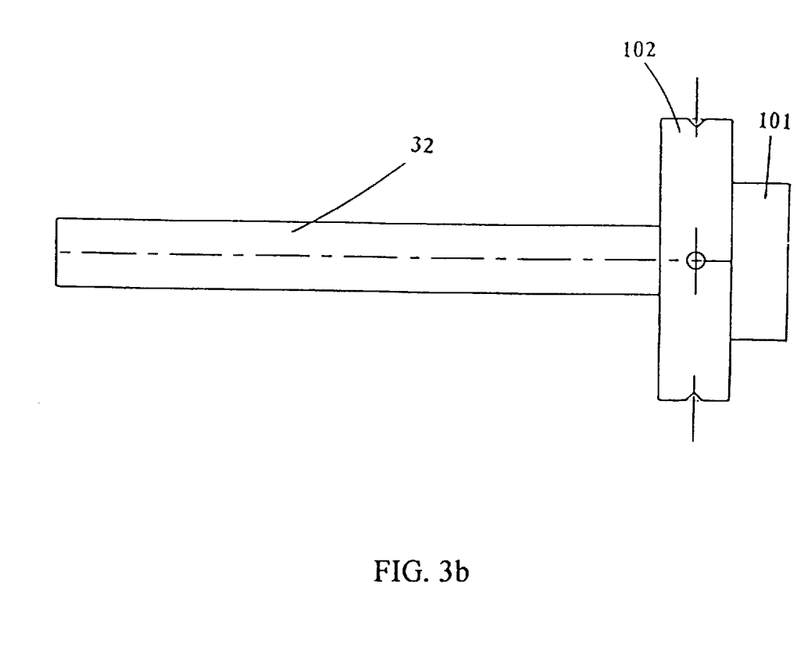
Figure 4A:
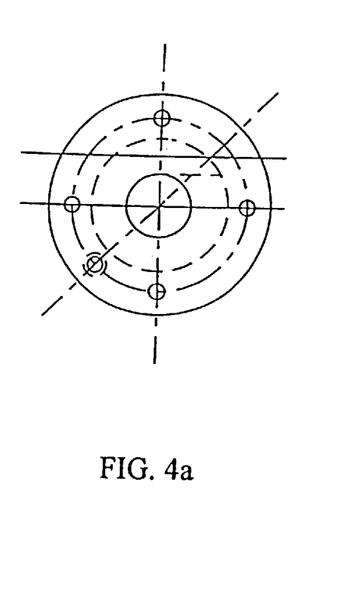
Figure 4B:
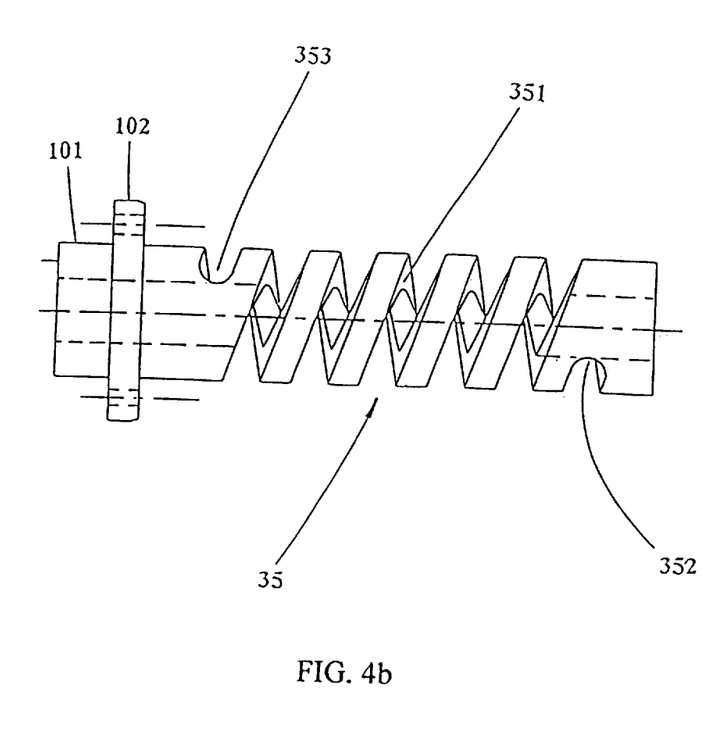
Figure 4C:
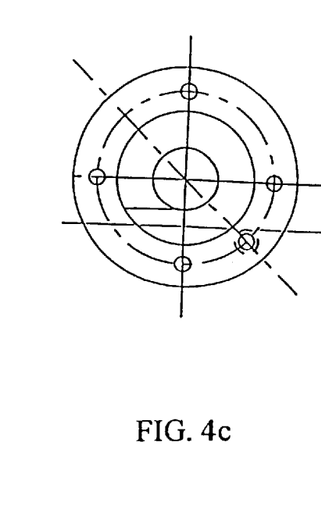
Figure 5A:
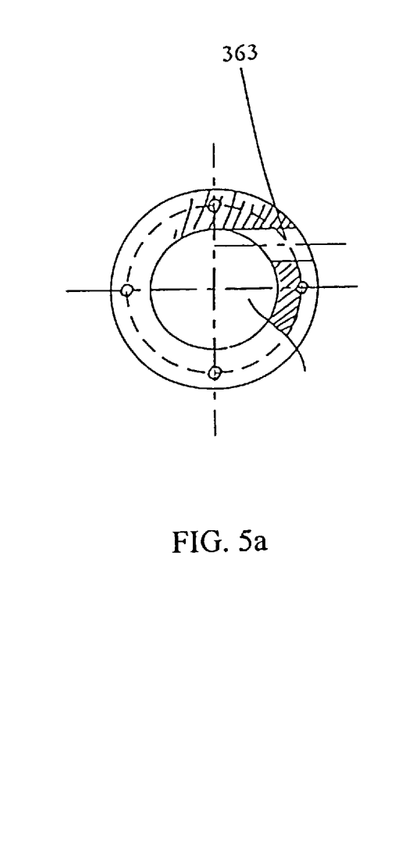
Figure 5B:
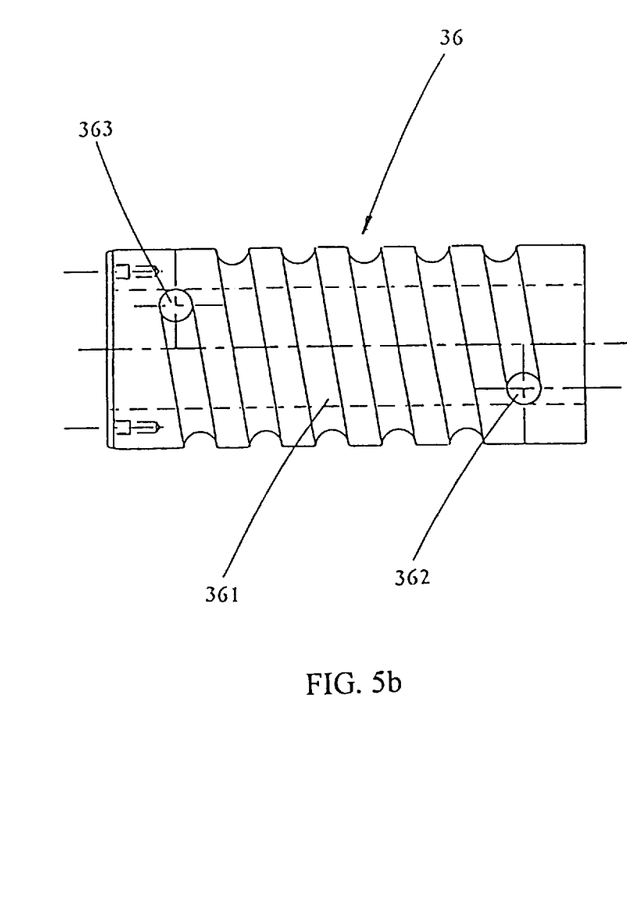
Figure 5C:
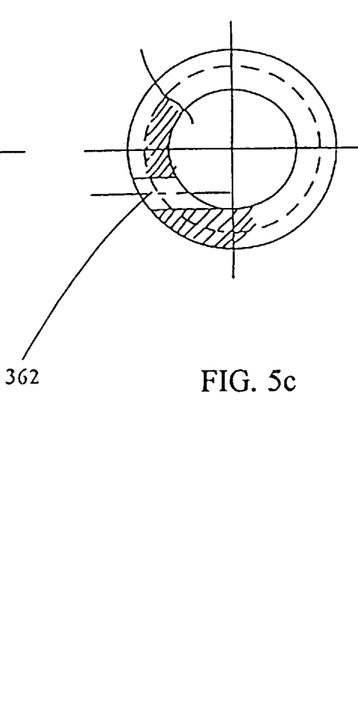

Referring to FIG. 2 which shows a schematic structure diagram of the ball worm and worm gear combination of the present invention, the ball worm 31 in the ball worm and worm gear combination 30 consists of an arbor 32, a helix body 33 and an housing 34 while FIG. 3 through FIG. 6 are the analytic component diagrams of the ball worm of the present invention where the helix body 33, consisted of a back-flow socket pipe 35 and a helical socket pipe 36, encases on the arbor 32 and the back-flow socket pipe 35 and helical socket pipe are fixed by means of screws 354 or other methods like tight fitting, and the back-flow socket pipe is set up by encasing on the said arbor 32, with back-flow channels 351 established therein, in helical shape; it also contains a shaft 101 and a flange 102. The back-flow channel 351 is a penetrated type of channel and the helical socket pipe 36, which is locked to be fixed to the back-flow socket pipe 35, has helical channels 361 set up in helical shape on its wall. The direction of their helix are opposite to that of the back-flow channel 351 and both ends of the helical channels 361, i.e. the starting and ending locations, have set up openings to penetrate to connect each other to their wall's inner surface to form a channel inlet 362 and a channel outlet 363 which are connected to the outlet and inlet locations 352 and 353, respectively, of the back-flow channel 351 contained in them to enable the two channels 351 and 361 be connected to each other to form a complete loop. The said housing 34 encases the helix body 33 to constrain the balls 20 in the helical channel 361 of the helix body 33 such that they will not drop off.

Figure 7:
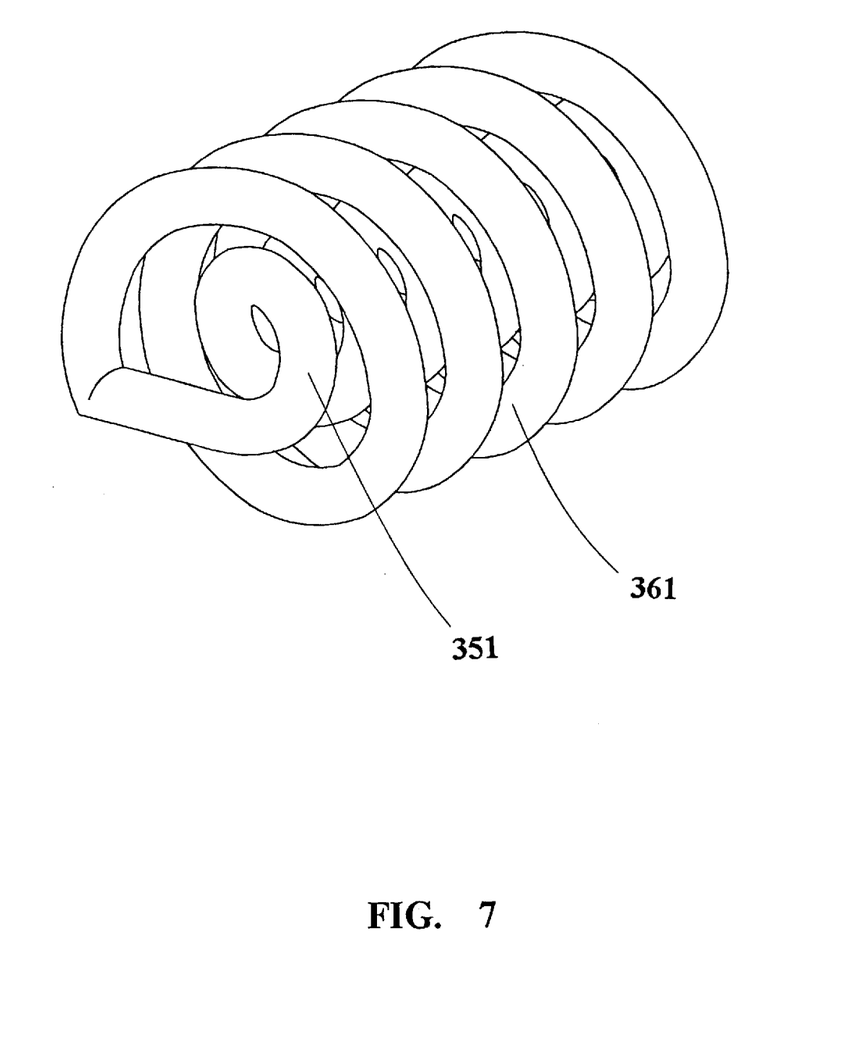
FIG. 7 is the schematic diagram of the motion locus of balls in the helical channel and the back-flow channel of the present invention.

Since both the back-flow channel 351 and the helical channel 361 are designed in helical shape with opposite helix directions and with their inlet and outlet ends connected each other, there is no need to change the mode of motion. Therefore, the balls 20 can roll smoothly from helical channel 361 into the channel outlet 363 and roll to the inlet location 353 of the back-flow channel 351. After entering the back-flow channel 351 the balls are rolled up to the outlet location 352 of the other end, following the helix direction of the back-flow channel 351, then enter the channel inlet 362 of the helical socket pipe 36 and roll back to the starting location of the helical channel 361, in this way, to perform helical rolling motion continuously; FIG. 7 is the schematic diagram of the motion locus of the helical channel 361 and the back-flow channel 351 of the present invention, since both of the channels are helical in design, the balls 20 can roll smoothly inside the channels.

Figure 6A:
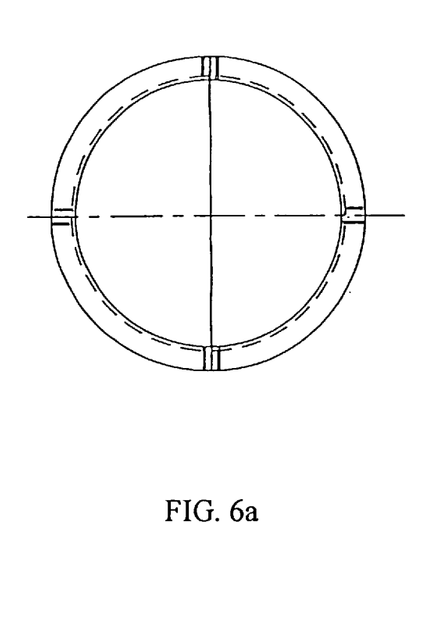
Figure 6B:
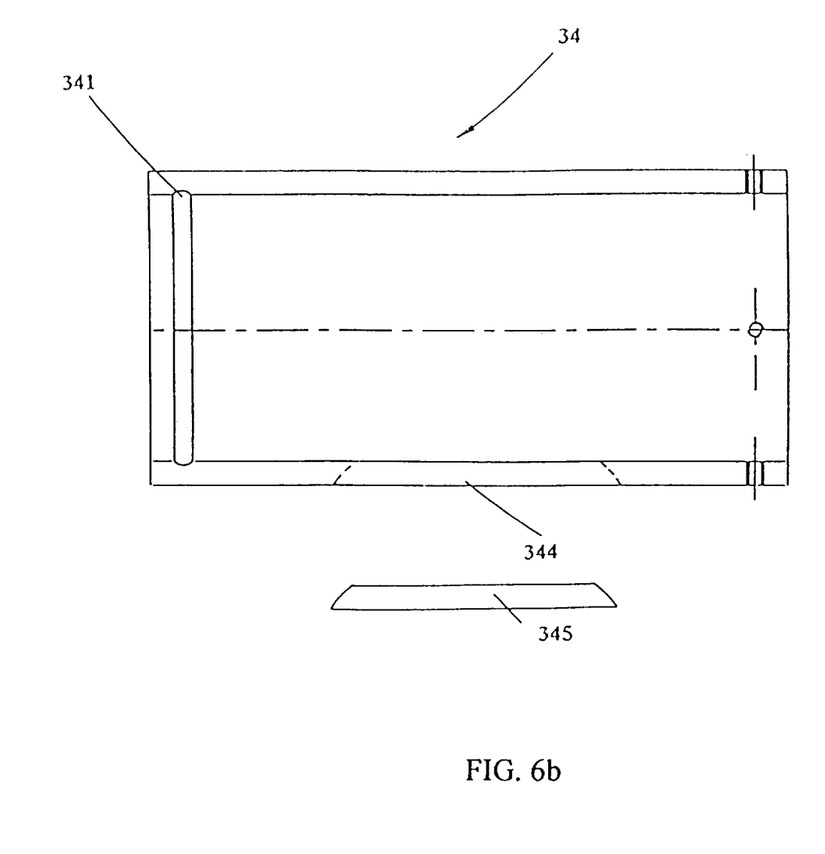
Figures 8A, 8B:
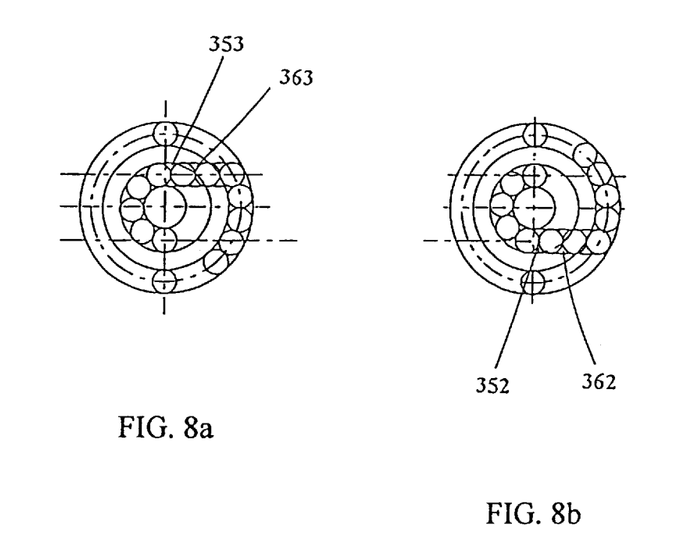
FIG. 8 is the cross-section of the side view structure of the ball worm of the present invention after combination.
Figure 8C:
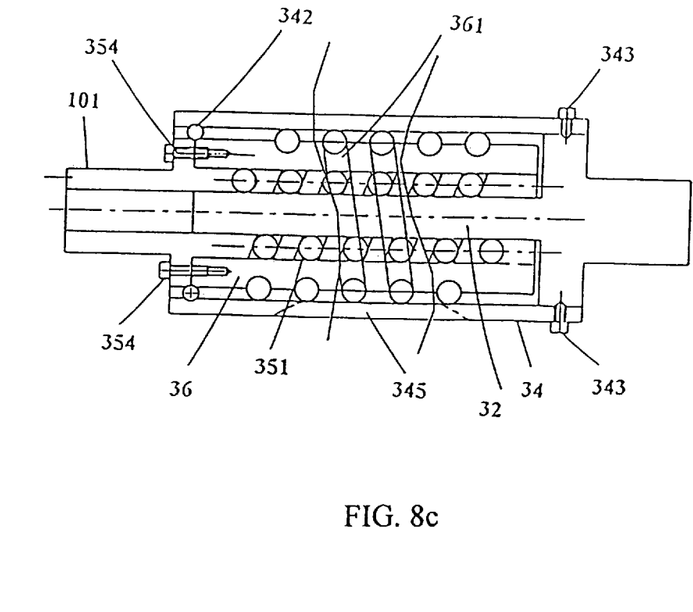

FIG. 8 is the cross-section views of the sides of ball worm of the present invention where the back-flow socket pipe 35 and helical socket pipe 36 are locked to fix one another to form a helix body 33 with its back-flow channel 351 and helical channel 361 contain a lot of balls 20 and is encased at its exterior with an housing 34 to constrain the balls 20 in the helical channel 361 such that they will not drop off; in the mean time, one end of the housing 34 is fixed to the end of the said arbor 32 by use of the screw 343 or other fixing devices and there is a ring of small channel 341 established at an appropriate location in the inner side of the other end (as shown in FIG. 6) with several small balls 342 locked in it to fix the housing 34 and the helix body 33 to protect the balls 20 from rolling off, in case the fixing between the housing 34 and the helix body 33 is loose; in the mean time, there is an opening 344 set up at appropriate place in the middle of the housing 34 to enable the balls 20 contained in it to mesh with the ball worm gear 15 and whenever the ball worm 31 does not mesh with the ball worm gear, there is a cover plate 345 set up, with its shape matching with the shape of the opening 344, at the opening 344 of the said housing 34 to press against the opening 344 to protect the balls 20 from dropping off; please note that the said helix body 33 and the arbor 32 are two different components, as the back-flow socket pipe 35 is driven to rotate, it make the helix body 33 perform rotating motion while the arbor stays fixed, to enable relative rotation between the arbor 32 and the back-flow socket pipe 35, it further enable the whole back-flow channel 351 to generate transport phenomenon and the balls in it will be driven to push forward, meanwhile, there is a housing 34 set up outside the helix body 33 and through the rotation of the helical socket pipe 36 while keeping the housing 34 fixed to generate transport phenomenon between them, and in the same way, to drive the balls 20 to roll forward; owning to the design that the rotation of the helical channel is opposite to that of the back-flow channel 351 in direction, the balls 20, rolled out from the back-flow channel 351, will roll back to the starting point of the helical channel 361 through the transport phenomenon, in the same way, the balls 20 in the helical channel 361 enter into the back-flow channel 351; in this way, it enables the balls 20 in the back-flow channel 351 as well as in the helical channel 361 to depend not only on the squeezing action but also on the transport phenomena of the back-flow channel 351 and the helical channel 361, to be driven to push forward to attain the back-flow effect of the balls 20, thereby, to improve throughly the various shortcomings of the ball worm 10 of the prior art.

Figure 9A:
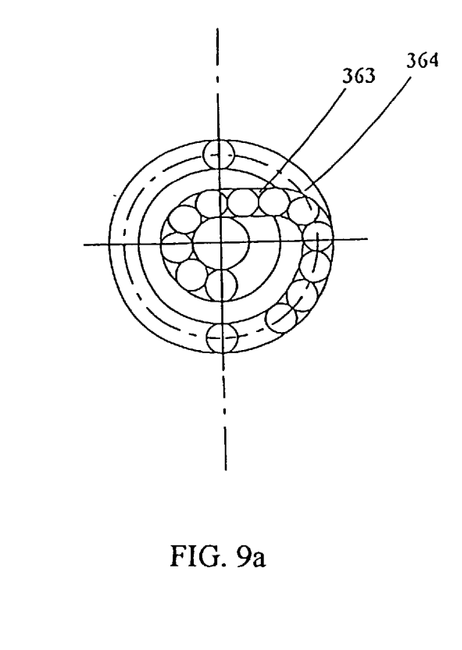
FIG. 9 is another embodiment of the present invention.
Figure 9B:
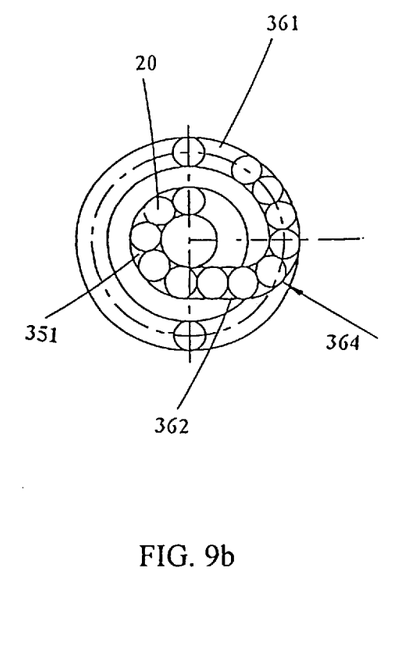
Figure 9C:
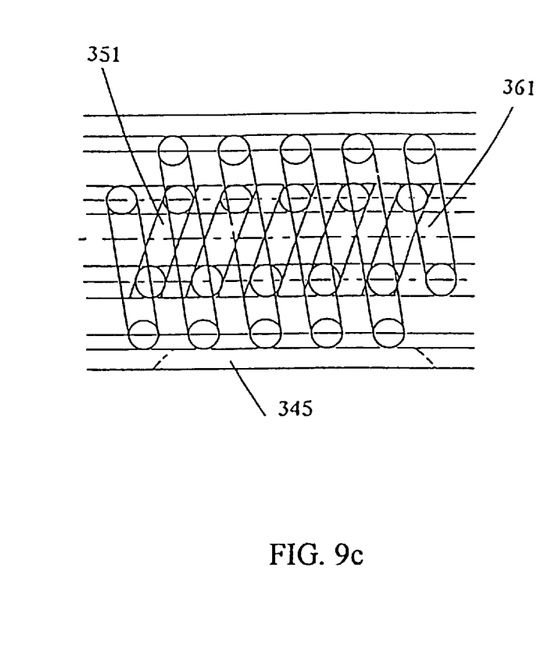

FIG. 9 is another embodiment of the present invention where the intersection of the inlet channel 362 and outlet channel 363, of which the said back-flow channel 351 connected to the helical channel 361, can be designed as a circular arc 364 as shown in the Figure, thereby, there are no more acute angles between the said back-flow channel 351 and the helical channel 361 so that the balls 20 can roll through even more smoothly.

To summarize the above-mentioned statements, we can understand that the "Ball Worm and Worm Gear Device" of the present invention actually possesses originality and practical value and it is not found in any publications which comply with the patentability of application for the present invention.

Althoughh the present invention has been illustrated and described previously with reference to the preferred embodiments thereof, it should be appreciated that it is in no way limitted to the details of such embodiments, but is capable of numerous modification within the scope of the appended claims.

What is claimed is:

1. A ball worm and worm gear device comprising:
a worm arbor;
a helix body encased on said worm arbor, said helix body comprising a back-flow pipe and helical socket pipe;
said back-flow socket pipe comprising a back-flow channel in helical shape which is disposed internally in said worm arbor, and said back-flow channel comprising an inlet and an outlet located at two ends, respectively, of the said back-flow channel;
said helical socket pipe comprising a helical channel established on an exterior surface of said worm arbor, said helical socket pipe comprising an inlet channel and an outlet channel at its ends, respectively, in connection with said inlet and said outlet of said back-flow channel, respectively;

a plurality of balls, contained in both the said helical channel and the said back-flow channel;

a housing, which is encased externally of said helix body to constrain the balls in the said helical channel;

wherein said worm arbor and said housing are affixed to each other by a connecting means.

2. A ball worm and worm gear device as claimed in claim 1 wherein said back-flow socket pipe and said helical socket pipe are affixed to each other by a screw means.

3. A ball worm and worm gear device as claimed in claim 1 wherein said inlet and outlet channels of said helical channel meet said outlet and inlet of said back-flow channel with arcuate interceptions, respectively.

4. A ball worm and worm gear device as claimed in claim 1 wherein said back-flow channel and said helical channel rotate in opposite directions.

5. A ball worm and worm gear device as claimed in claim 1 wherein said housing has a channel set up to contain said plurality of balls.

6. A ball worm and worm gear device as claimed in claim 1 wherein said housing contains an opening to enable said plurality of balls to mesh with the ball worm gear when the ball worm does not mesh with the ball worm.

* * * * *